US011155301B2

(12) United States Patent
Pachha et al.

(10) Patent No.: US 11,155,301 B2
(45) Date of Patent: Oct. 26, 2021

(54) METHOD OF REDUCING KNIT LINE DURING COMPRESSION MOLDING OF CARBON FIBER SMC FOR COMPLEX 3D STRUCTURAL APPLICATION

(71) Applicants: Magna Exteriors Inc., Concord (CA); Brian A. Krull, Sterling Heights, MI (US)

(72) Inventors: Ranjit Pachha, Brampton (CA); Zongxun Wang, Toronto (CA); Joseph J. Laux, Ermatingen (CH); Brian A. Krull, Sterling Heights, MI (US)

(73) Assignee: MAGNA EXTERIORS, INC, Concord (CA)

( * ) Notice: Subject to any disclaimer, the term of this patent is extended or adjusted under 35 U.S.C. 154(b) by 0 days.

(21) Appl. No.: 16/635,055

(22) PCT Filed: Oct. 19, 2018

(86) PCT No.: PCT/US2018/056640
§ 371 (c)(1),
(2) Date: Jan. 29, 2020

(87) PCT Pub. No.: WO2019/079676
PCT Pub. Date: Apr. 25, 2019

(65) Prior Publication Data
US 2020/0262480 A1    Aug. 20, 2020

Related U.S. Application Data

(60) Provisional application No. 62/574,435, filed on Oct. 19, 2017.

(51) Int. Cl.
*B62D 21/11* (2006.01)
*B29C 43/00* (2006.01)
(Continued)

(52) U.S. Cl.
CPC ............ *B62D 21/11* (2013.01); *B29C 43/003* (2013.01); *B29C 43/021* (2013.01); *B29C 43/18* (2013.01);
(Continued)

(58) Field of Classification Search
CPC .... B62D 29/04; B62D 29/041; B62D 21/152; B29L 2031/3002; B29L 2031/3055;
(Continued)

(56) References Cited

U.S. PATENT DOCUMENTS

2003/0090129 A1   5/2003   Riley et al.
2011/0143110 A1   6/2011   Tsuchiya et al.
2017/0183036 A1   6/2017   Murata et al.

FOREIGN PATENT DOCUMENTS

EP    1473130 A1      11/2004
FR    2644126 A1 *    9/1990    ............ B62D 21/11
(Continued)

OTHER PUBLICATIONS

Canadian Office Action for Application No. 3,078,520, dated May 27, 2020.
(Continued)

*Primary Examiner* — Camie S Thompson
(74) *Attorney, Agent, or Firm* — Warn Partners P.C.

(57) ABSTRACT

A structural automotive sub frame component (10) that is formed from a sheet molding compound having carbon fibers. The three dimensional structure is formed of a resin fiber mixture having a resin material infused with carbon fibers having a length of about 12.5 mm (0.5 inches) dispersed throughout the structural automotive sub frame component (10) and an even manner such that there are no resin rich areas or knit lines present. The absence of knit lines provides a structural automotive sub frame component (10) that has a high degree of flex modulus, tensile strength (Continued)

properties well also providing a greater breaking load property due to the absence of knit lines.

13 Claims, 6 Drawing Sheets

(51) Int. Cl.
| | |
|---|---|
| *B29C 43/02* | (2006.01) |
| *B29C 43/18* | (2006.01) |
| *B29C 43/34* | (2006.01) |
| *B29C 43/52* | (2006.01) |
| *B29C 70/18* | (2006.01) |
| *B29C 70/46* | (2006.01) |
| *B62D 29/04* | (2006.01) |
| *B29K 105/08* | (2006.01) |
| *B29L 31/30* | (2006.01) |

(52) U.S. Cl.
CPC .............. *B29C 43/34* (2013.01); *B29C 43/52* (2013.01); *B29C 70/18* (2013.01); *B29C 70/465* (2013.01); *B62D 29/04* (2013.01); *B29C 2043/3488* (2013.01); *B29K 2105/0863* (2013.01); *B29L 2031/3002* (2013.01); *B29L 2031/3055* (2013.01)

(58) Field of Classification Search
CPC .......... B29C 2043/3488; B29C 70/465; B29C 70/18; B29C 43/003; B29C 43/021
USPC ............ 296/193.06, 203.03, 187.03, 187.09, 296/193.09; 428/297.4, 31; 264/210, 10
See application file for complete search history.

(56) References Cited

FOREIGN PATENT DOCUMENTS

| | | |
|---|---|---|
| FR | 2644126 A1 | 9/1990 |
| JP | 2004284472 A | 10/2004 |
| JP | 2013176984 A | 9/2013 |
| WO | 2016003909 A1 | 1/2016 |

OTHER PUBLICATIONS

International Search Report and Written Opinion for Application No. PCT/US2018/056640, dated Feb. 13, 2019.

\* cited by examiner

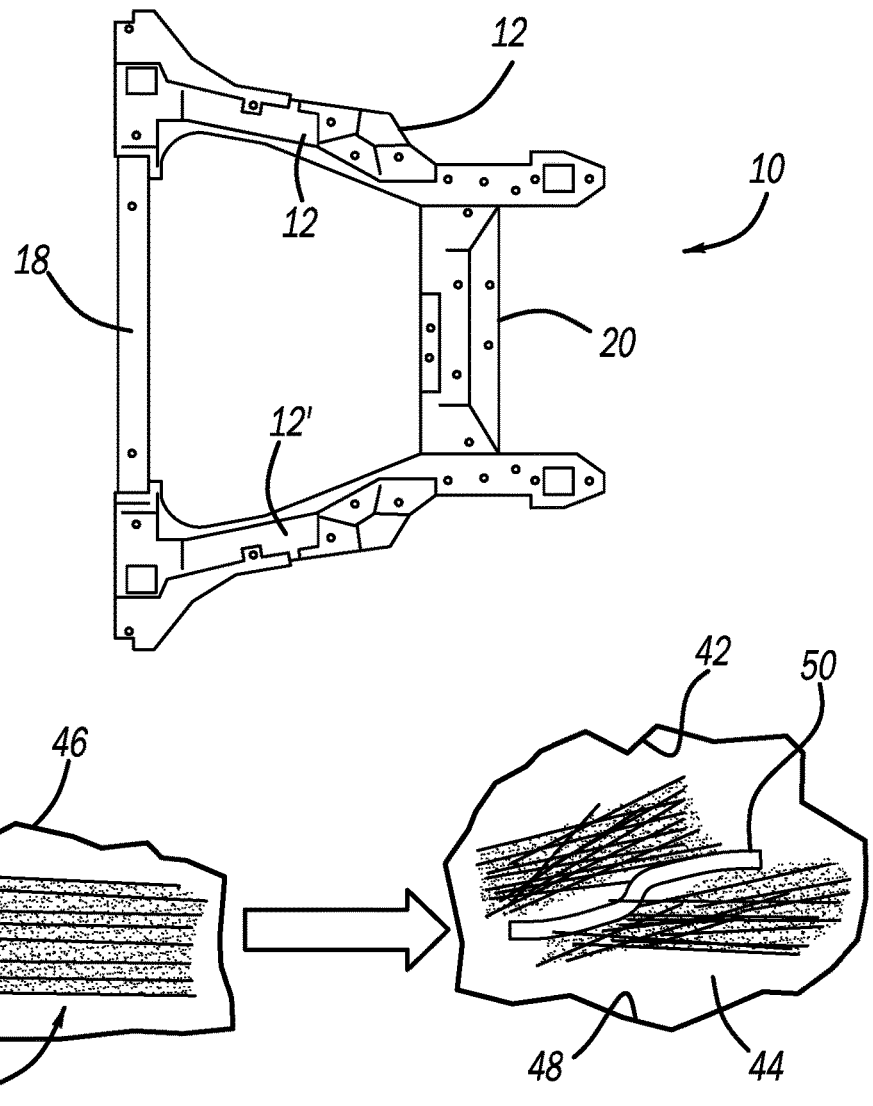
FIG - 2
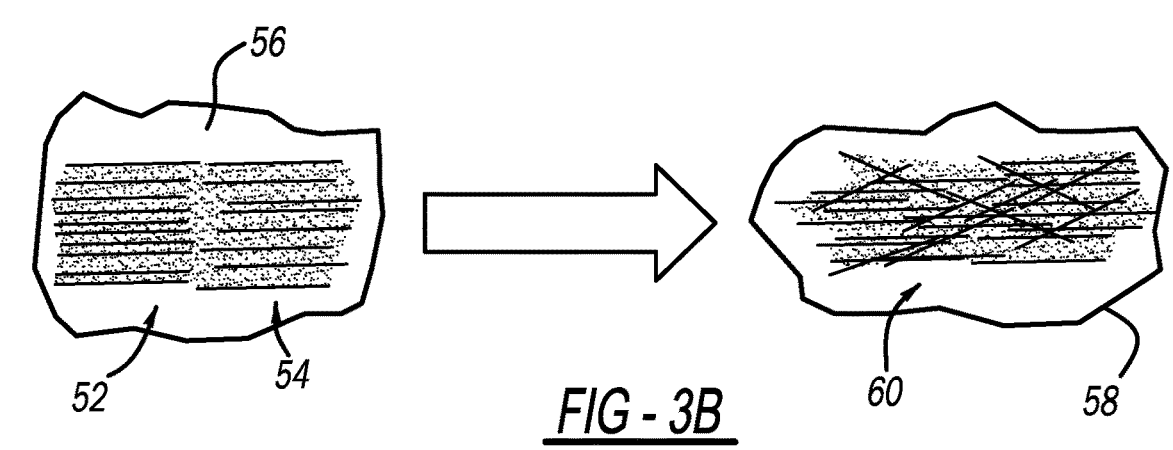
FIG - 3A
FIG - 3B

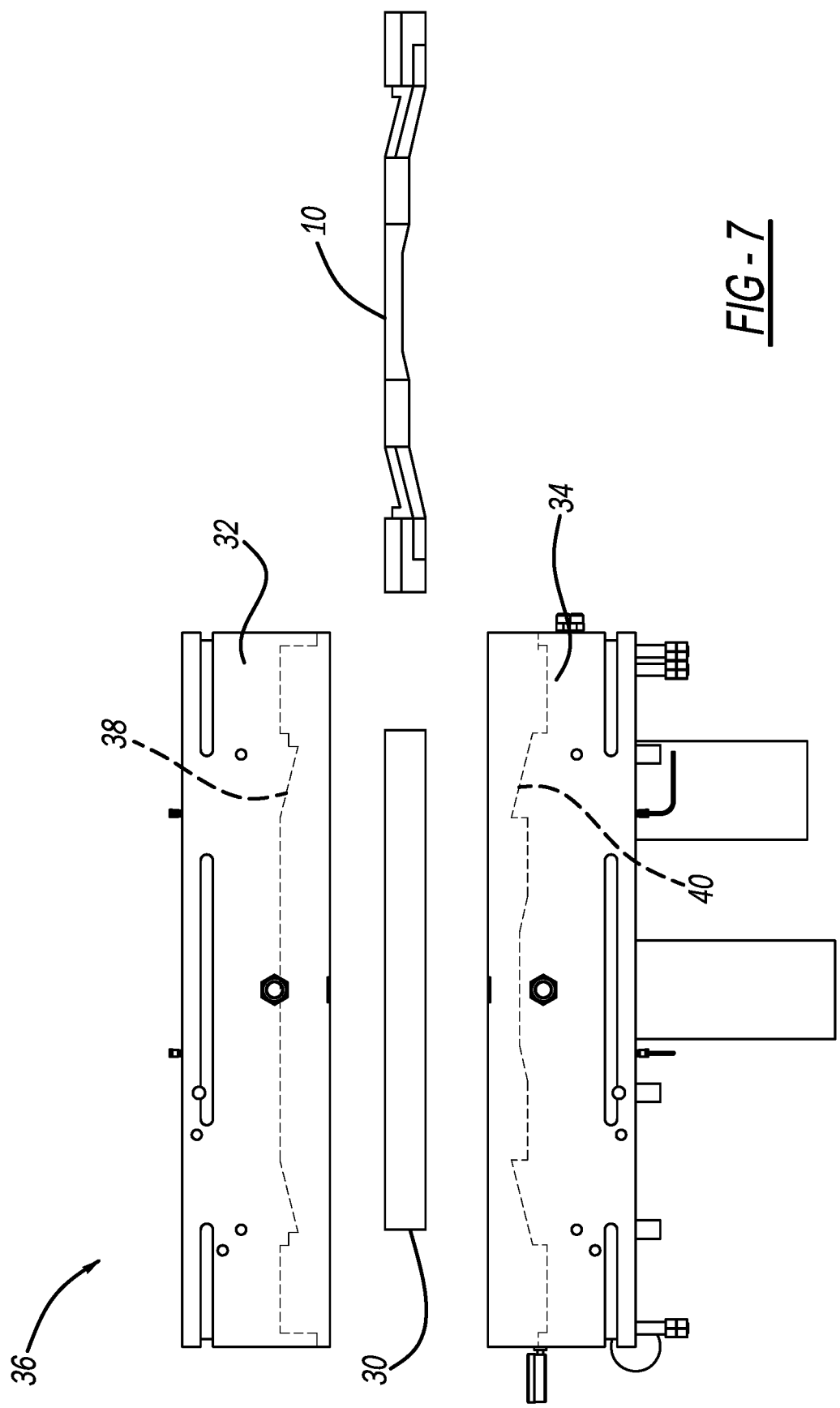

METHOD OF REDUCING KNIT LINE DURING COMPRESSION MOLDING OF CARBON FIBER SMC FOR COMPLEX 3D STRUCTURAL APPLICATION

CROSS-REFERENCE TO RELATED APPLICATIONS

This application is a National Stage of PCT International Application No. PCT/US2018/056640 filed Oct. 19, 2018, which claims the benefit of U.S. Provisional Patent Application No. 62/574,435 filed on Oct. 19, 2017. The disclosures of the above applications are incorporated herein by reference.

FIELD OF THE INVENTION

The present invention relates to compression molding a complex three dimensional structural automotive frame using carbon sheet molding compound, and having minimal knit lines.

BACKGROUND OF THE INVENTION

Structural automotive parts like the vehicle sub frame, are required to perform under continuous load throughout the lifetime of the vehicle. Any defect during manufacturing of these parts can cause premature failure of the part and the vehicle. Until now these structural parts were typically made from metals, such as steel or Aluminum. Recently efforts have been made to develop composite structural parts to reduce weights. Carbon Sheet Molding Compound (SMC) is considered as one of the candidates to replace steel structural parts due to its ability to be compression molded into complex geometry and also its ability to achieve high mechanical properties required for a structural automotive sub frame part. Carbon SMC is manufactured by dispersing chopped carbon fibers in a film of resin. This material is then compressed in a sheet form and allowed to thicken over a period of time. Once thickened the SMC can be compression molded into desired shape when required.

In the compression molding process a sheet molding compound blank is placed within a mold and then pressed between two halves of a mold tool while applying heat and pressure to form a completed part. During this molding process, the carbon SMC flows into various corners, edges and hollow structures from different sides and angles creating multiple flow fronts, and these flow fronts finally merge together to form a complete part. During the merging of the flow front, the Carbon fiber/resin combination from each flow do not merge uniformly, instead the fibers tend to bunch up and swirl creating what is referred to as a knit line or weld lines. Knit lines create weak spots in the finished part because they are areas where little or no fiber is mixed with the resin, thereby reducing the strength of the part in certain regions. When using compression molding to create structural parts they are required to meet certain mechanical properties requirement, the presence of knit lines in a structural part formed by compression molding can render the structural part unsuitable for particular applications. It is therefore desirable to develop new compression molding methods that reduce the occurrence of knit lines and allow for structural parts to be created that meet or exceed the mechanical and durability properties for particular applications.

SUMMARY OF THE INVENTION

The present invention is directed to a structural automotive sub frame component that is formed from a sheet molding compound having carbon fibers. The structural automotive sub frame component has a three dimensional structure that has a plurality of side members that each include a plurality of vertical surfaces intersecting with a plurality of horizontal surfaces. A plurality of cross members of the three dimensional structure extend between the plurality of side members, where each of the plurality of cross members has a plurality of vertical surfaces intersecting with the plurality of horizontal surfaces. Additionally the three dimensional structure includes a plurality of structural ribs formed on and extending away from at least one of the plurality of horizontal surfaces of the plurality of side members and a plurality of structural ribs formed on and extending away from at least one of the plurality of horizontal surfaces of the plurality of cross members. The three dimensional structure is formed of a resin blank formed from a resin fiber mixture having a resin material infused with carbon fibers having a length of about 0.5 inches dispersed throughout the structural automotive sub frame component and an even manner such that there are no resin rich areas or knit lines or minimum resin rich/knit lines present. The absence of knit lines provides a structural automotive sub frame component that has a high degree of flex modulus, tensile strength properties well also providing a greater breaking load property due to the absence of knit lines. The absence or reduced knit line defects may also help in improving the durability properties of the sub frame component.

BRIEF DESCRIPTION OF THE DRAWINGS

The present invention will become more fully understood from the detailed description and the accompanying drawings, wherein:

FIG. 2 is a top plan view of the vehicle sub frame.

FIG. 3A is a schematic diagram showing the blending of two individual flow fronts with long fibers and the resin knit lines formed.

FIG. 3B is a schematic diagram showing the blending of two individual flow fronts with short fibers and the intermingling of the fibers without knit lines.

FIG. 7 is a schematic diagram of a compression molding tool forming a structural automotive sub frame component in accordance with one aspect of the present invention.

DETAILED DESCRIPTION OF THE PREFERRED EMBODIMENTS

The following description of the preferred embodiment is merely exemplary in nature and is in no way intended to limit the invention, its application, or uses.

Figure 1A:
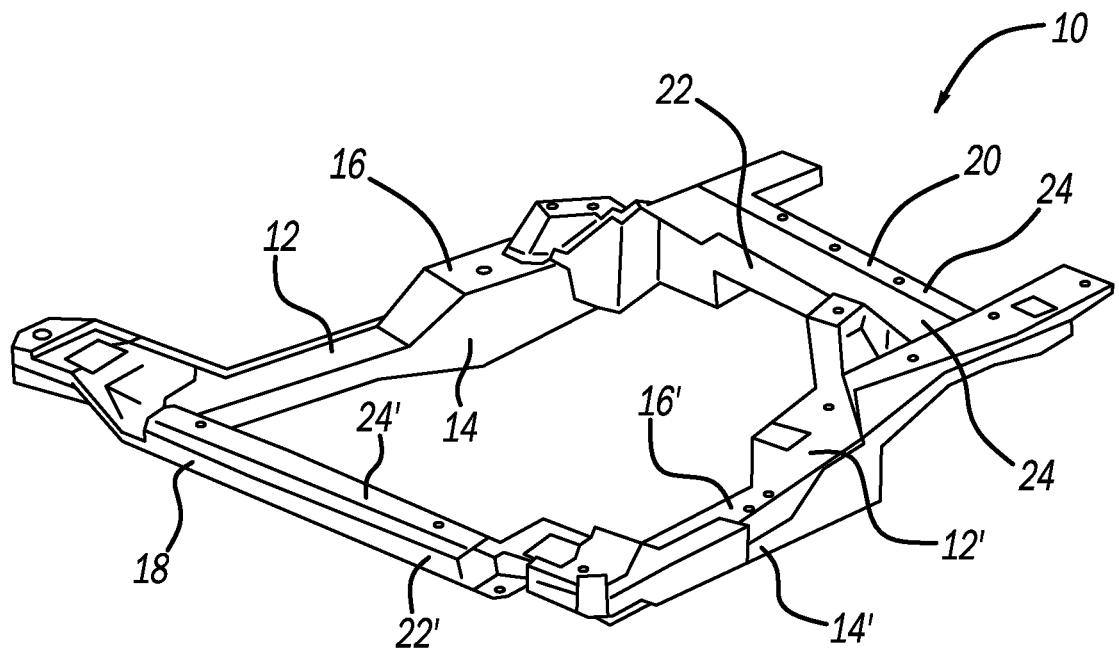
FIG. 1A is a top side perspective view of a vehicle sub frame.
Figure 1B:
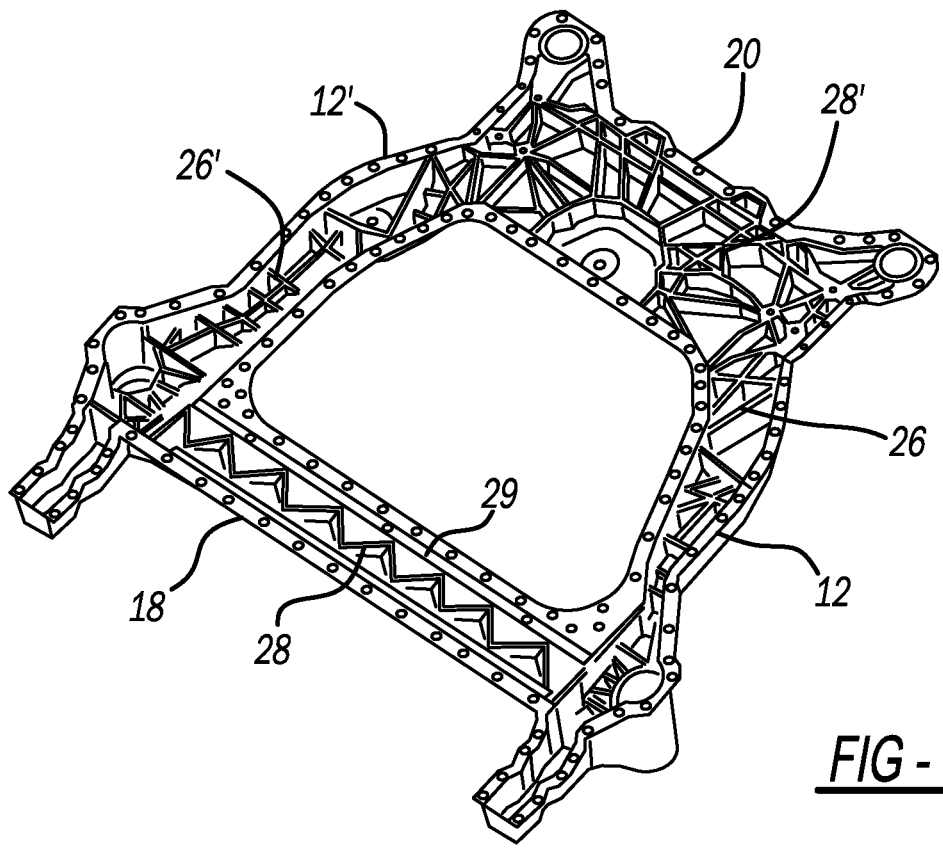
FIG. 1B is a bottom side perspective view of the vehicle sub frame.

Referring now to FIGS. 1A, 1B and 2 a sub frame component 10 that is an automotive structural automotive sub frame component is shown. The structural automotive sub frame component 10 is a front vehicle sub frame configured to be located below the engine, however, it is within the scope of this invention for the sub frame component 10 to be any type of structural part of a vehicle, including chassis, rear sub frame, front end module, roof pillars or any other related components. The structural automotive sub frame component 10 is formed as a single piece through a compression molding process and has a three dimensional structure with a plurality of side members 12, 12' each including vertical surfaces 14, 14' intersecting with a plurality of horizontal surfaces 16, 16'. The entire structural automotive sub frame component 10 is one piece without any connections of multiple components. The structural automotive sub frame 10 also includes a plurality of cross members 18, 20 that extend between the plurality of side members 12, 12'. Each of the plurality of cross members 18, 20 has a plurality of vertical surfaces 22, 22' that intersect with a plurality of horizontal surfaces 24, 24'. The sub frame component 10 may also have hollow metal inserts, fasteners and bushings which are co-molded in during the compression molding process. Referring to FIG. 1B shows the bottom side of the structural automotive sub frame component 10, which includes a plurality of structural ribs 26, 26' that are formed on and extend away from at least one of the plurality of horizontal surfaces 24, 24' of the cross members 18, 20 to add strength to the cross members 18, 20. There are also a plurality of structural ribs 28, 28' that extend away from at least one of the plurality of horizontal surface 16, 16' of the side members 12, 12' to add strength to the side members 12, 12'. The plurality of structural ribs 26, 26', 28, 28' are formed from the same material as the rest of the structural automotive sub frame component 10 and include a resin and fiber mixture having resin material infused with carbon fibers about 0.5 inches in length. The plurality of structural ribs 26, 26', 28, 28' are formed, along with the entire structural automotive sub frame component using compression molding. The plurality of structural ribs 26, 26', 28, 28' are formed without injection molding.

Referring to FIG. 7 the entire structural automotive sub frame component 10 is formed from compression molding a resin blank 30 that is placed between a top half 32 and bottom half 34 of a compression forming machine 36. The resin blank 30 pressed between a top half forming surface 38 and a bottom half forming surface 40 for form the resin blank 30 into the structural automotive sub frame component 10. The top half forming surface 38 and bottom half forming surface 40 include a three-dimensional geometry that includes rib forming surfaces that form the ribs 26, 26', 28, 28', vertical forming surfaces 14, 14', 22, 22' and horizontal forming surfaces 16, 16', 24, 24'. The forming surfaces 38, 40 in the compression forming machine 36 also include a plurality of sharp corner forming surfaces that have an angle of less than or equal to 90° relative to the forming surface. Additionally the mold tool also has at least one hollow tubular structure forming surface that allows for insertion of a tubular structure 29 that can be co-molded into the sub frame component 10. The tubular structure 29 can be a hollow metal insert, fastener, bushing or other insert. The three dimensional structure may or may not have a tubular structure. The method also includes providing a sheet molding compound charge that covers between about 25% to about 90% of the surface area of the forming surface of the mold tool, preferably 40-80% coverage of the tool. The sheet molding compound charge is preformed into a resin blank formed from a resin fiber mixture having a polymeric resin with carbon fibers having a length of about 0.5 inches. The carbon fibers are uniformly dispersed throughout the resin blank that is compression molded.

The resin blank and formed structural automotive sub frame component 10 are formed of a resin fiber mixture having a resin material infused with carbon fibers having a length of about 0.5 inches. While the length of the carbon fibers are stated to be about 0.5 inches it is within the scope of this invention for the fibers to have different lengths being selected from generally less than about 0.9 inches or between about 0.3 inches to about 0.9 inches, about 0.4 inches to about 0.8 inches, about 0.4 inches to about 0.7 inches or less than or equal to about 0.5 inches.

The resin blank used to form the structural automotive sub frame component 10 is made from resin fiber mixture containing resin and carbon fibers. Typically the resin fiber mixture has carbon fibers present in the amount of about 50% by weight or more of the total resin mixture value. While the ratio of resin to carbon is stated as 50:50, it is within the scope of this invention the ratio to range from 30:70 to 70:30. The type of thermoset resin used in this invention is vinyl ester resin, but not limited to vinyl ester resin, it is within the scope of this invention that other thermoset resins like polyurethane, epoxy, unsaturated polyester, phenolic or any other suitable thermoset polymers can be used.

The method of forming the structural automotive sub frame component 10 includes heating the compression forming machine 36 to a suitable temperature for forming the resin blank 30. Typically the temperature is a temperature suitable to make the resin component of the resin fiber mixture to liquefy and flow within the compression molding machine 36 and cure to form the structural automotive sub frame component 10. Once the compression molding machine 36 has been heated to a forming temperature top half 32 and bottom half 34 are separated or moved apart allow access to the forming surfaces. Additional metal inserts or bushings which form the integral part of the sub frame are also placed in the tool prior to the placement of charge. These inserts are held onto their locations with the help of guiding pins to ensure that these inserts or bushings do not move during the flow of carbon SMC around it. Next the resin blank 30 is placed onto the forming surface of the compression molding machine 36. Then the top half 32 and bottom half 34 are moved together to close compression molding machine 36 pressure is applied to the resin blank 30. Then a step of flowing the resin and carbon fibers of the resin blank 30 occurs where the resin and carbon fire fibers flow to cover the entire forming surface area, which is defined as the top half forming surface 38 and bottom half forming surface 40. After a cooling step the compression molding machine 36 is opened and the resin blank 10 has been formed into the structural automotive sub frame component 10 which is removed from the compression forming machine 36.

During the step of flowing the resin and carbon fibers of the resin blank 30 different results occur depending on the length of the fibers in the resin blank 30. FIGS. 3A and 3B are schematic diagrams representing the impact of fiber length during the compression molding of the resin blank 30 into the structural automotive sub frame component. More specifically FIG. 3A shows two individual long fiber flow fronts 42, 44 dispersed in resin that are part of a resin blank 46. The long fiber flow fronts 42, 44 include fibers that are one inch or longer. During the compression molding steps similar to those described with regard to FIG. 7 above, the resin blank 46 is formed into a sub frame component 48. The one inch or greater length of the fibers in the long fiber flow fronts 42, 44 cause the two flow fronts to clump together as the resin and fibers flow through the mold. The result is that the sub frame component 48 has clumped fiber areas and resin rich areas, referred to as knit lines 50. As discussed below, the knit lines 50 create weak areas in the sub frame component 48.

FIG. 3B shows two individual short fiber flow fronts 52, 54 dispersed in resin that are part of the resin blank 56 according to the embodiments of the present invention. The short fiber flow fronts 52, 54 include fibers that are about one half inch or less. During the compression molding steps similar to those described with regard FIG. 7 above, the resin blank 56 is formed into a sub frame component 58. The about one half inch or less fibers in the short fiber flow fronts 52, 54 cause the two flow fronts to blend together and form blended fibers 60 without any knit lines being formed. The result is that the sub frame component 58 has little or no knit lines, and the sub frame component 58 created has superior break load strength properties when compared to a component formed using fibers that are one inch or more in length.

Figure 4:
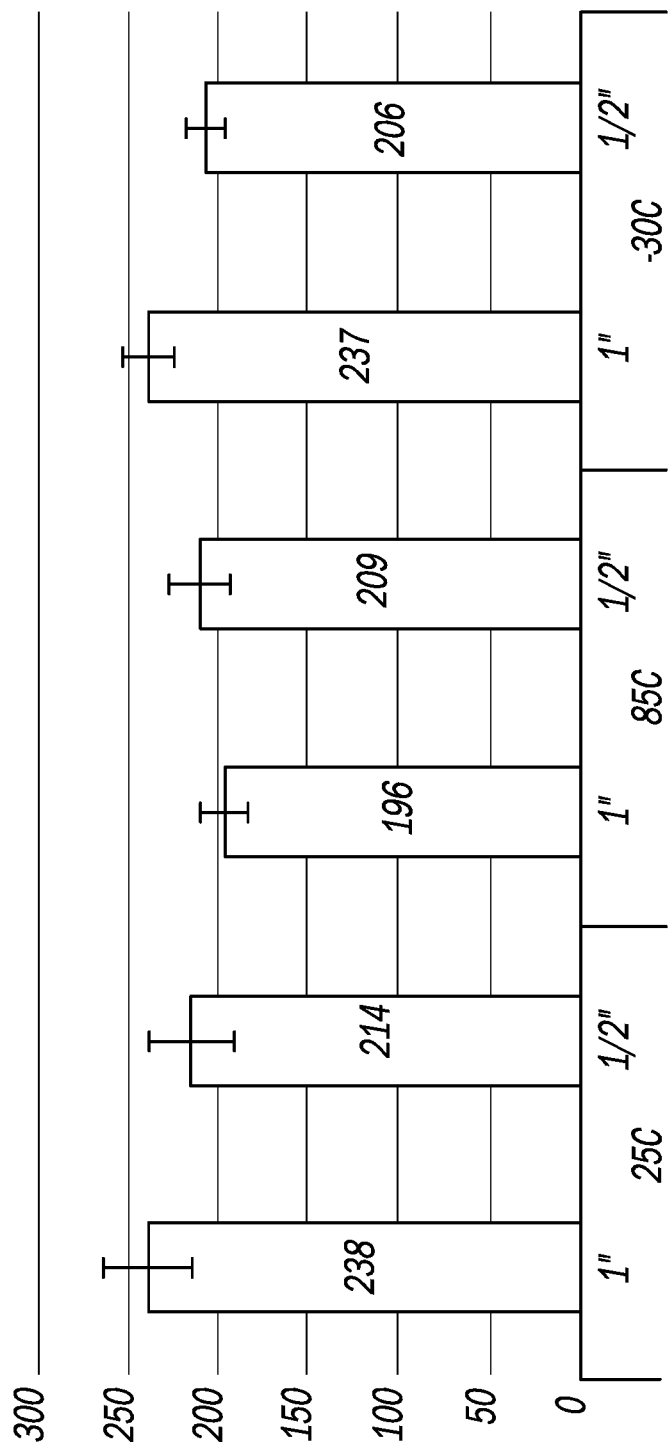
FIG. 4 is a graph comparing the tensile strength, at various temperatures of a carbon sheet molding compound sample having one inch carbon fibers compared to a second carbon sheet molding compound having half inch carbon fibers.
Figure 5:
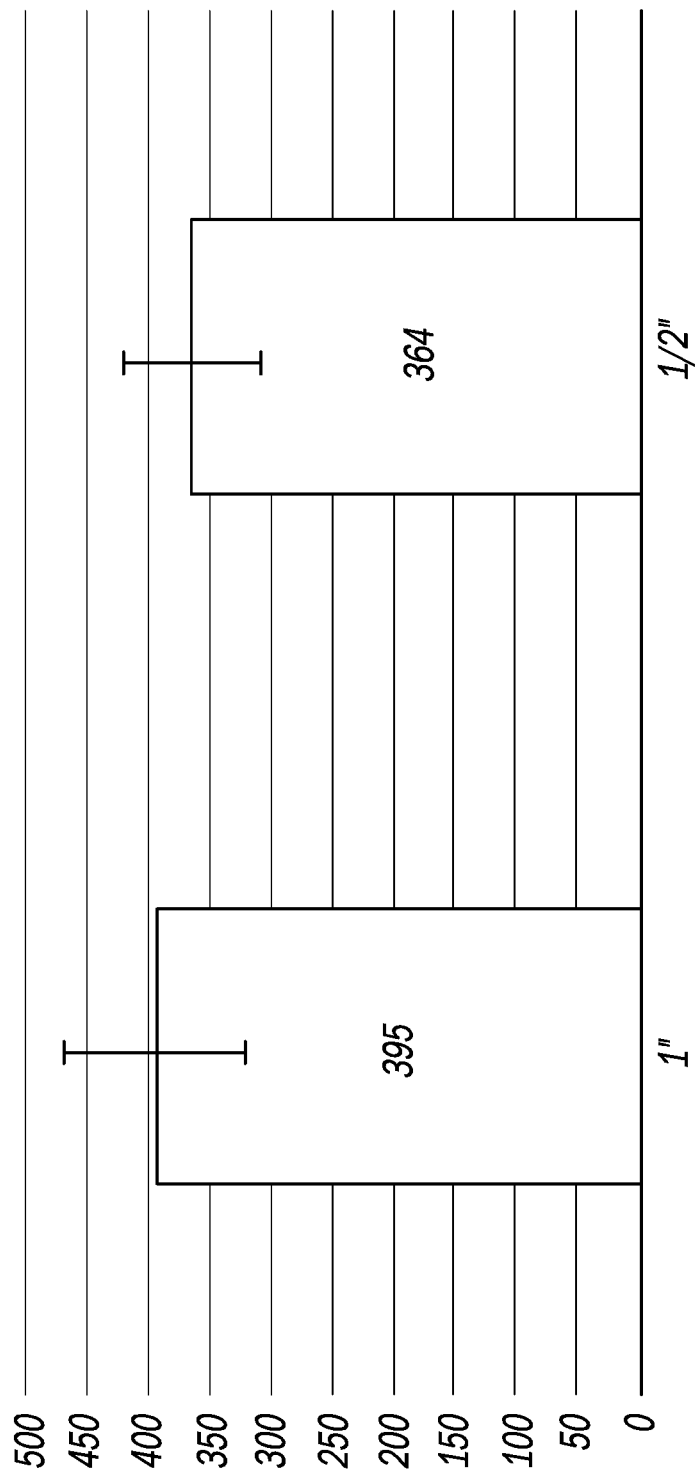
FIG. 5 is a graph comparing the flex strength of a carbon sheet molding compound sample having one inch carbon fibers compared to a second carbon sheet molding compound having half inch carbon fibers.

FIGS. 4 and 5 are graphs representing the tensile strength and flex properties at various temperatures of resin blank 46 containing fibers of one inch or greater and resin blank 56 containing fibers of about one half inch or less. Referring, to FIG. 4 the graph shows the results of a tensile strength test performed according to ASTM D 3039 guidelines. At 25 C the tensile strength of the resin sample containing one inch fibers was 238 MPa, while the tensile strength of the resin sample containing about half inch or less fibers was less at 214 MPa. At 85 C the tensile strength of the resin sample containing one inch fibers was 196 MPa, while the tensile strength of the resin sample containing about half inch or less fibers was higher at 209 MPa. At −30 C the tensile strength of the resin sample containing one inch fibers was 237 MPa, while the tensile strength of the resin sample containing about half inch or less fibers was less at 206 MPa. Overall the tensile strength of the samples containing about half inch or less fibers did not change much between temperatures, while the sample with one inch or greater fibers had an appreciable drop in tensile strength at 85 C. FIG. 5 is a graph showing the results of a flex strength test that was performed according to ASTM D790 guidelines. The test results of the one inch resin sample showed a flex strength of 395 MPa and the about one half inch or less resin sample had a flex strength measure at 364 MPa. Based on the above results it is concluded that the difference in tensile strength and flex properties between the one inch and half inch samples was not too great and there is no significant drop off in tensile strength or flex. Overall the about one half inch or less fiber resin samples behave similar to the one inch fiber resin sample.

Figure 6:
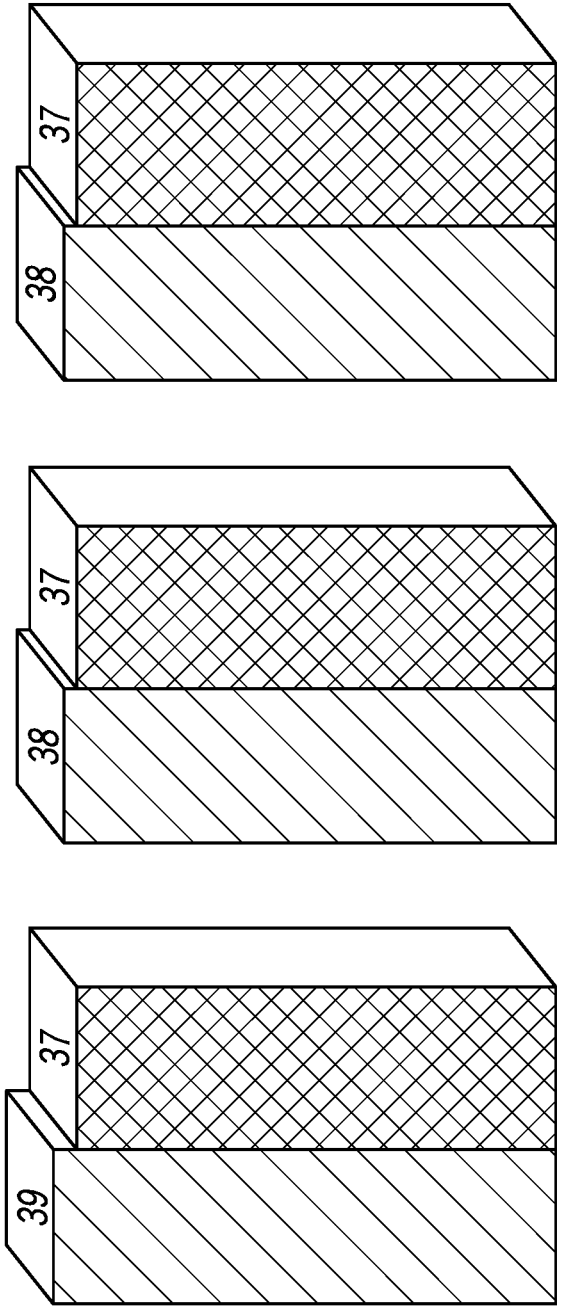
FIG. 6 is a graph comparing the results of a spiral flow length test of a carbon sheet molding compound sample having one inch carbon fibers compared to a second carbon sheet molding compound having half inch carbon fibers.

FIG. 6 shows the results of three spiral flow trials that performed using resin blanks containing fibers that are one inch or longer compared to blanks that contain fibers of about one half. During a spiral flow trial the resin material is placed into a mold tool having a spiral shaped channel and is then compressed to measure how far the material will flow. This is done to find out how two different materials compare in terms of their ability to flow or move within a mold tool during compression molding. In the present case the results of the three trials are show in inches. Trial 1 results show that the resin material having one inch fibers flowed 39 inches, while the half inch fiber resin material flowed 37 inches. Trials 2 and 3 results show that the resin material having one inch fibers flowed 38 inches, while the half inch fiber resin material flowed 37 inches. The results of the spiral flow test suggest that the two materials are very similar in terms of their ability to flow in a mold.

EXAMPLE

Structural automotive sub frame components are formed from carbon fiber reinforced resin blanks according to the compression molding process shown in FIG. 7. A three point bend tests are performed on each of the structural automotive sub frame components. During the three point bend test different areas, which include the rear side, front side, left side, and right side are subjected to a bending load until the component breaks. The amount of force need to break the component, called the breaking load and the measured deflection of the component at the time of breaking is recorded. The results indicate how much load the structural automotive sub frame component can handle prior to breaking and how much deflection occurs at the time of the break. In the present example trials were conducted using two different structural automotive sub frame components. One category of structural automotive sub frame component was formed from a resin blank having carbon fibers one inch or longer and a second category of structural automotive sub frame component was formed from a resin blank having carbon fibers about one half inch or less. The goal was to determine if the structural automotive sub frame component had a higher breaking load and more deflection at the time of the break. The following tables summarized the results.

TABLE 1.0

Sub frame Rear Side Comparison

| Trial | Fiber Length | Breaking Load, N | Deflection at Failure, mm |
|---|---|---|---|
| Trial 1 | ½" | 6563 | 4.56 |
| Trial 2 | ½" | 7271 | 5.28 |
| Trial 1 | 1" | 7596 | 5.08 |
| Trial 2 | 1" | 3822 | 2.99 |

TABLE 1.1

Sub frame Front Side Comparison

| Trial | Fiber Length | Breaking Load, N | Deflection at Failure, mm |
|---|---|---|---|
| Trial 1 | ½" | 7298 | 15.5 |
| Trial 2 | ½" | 8032 | 13.64 |
| Trial 1 | 1" | 5322 | 10.98 |

TABLE 1.2

Sub frame Left Side Comparison

| Trial | Fiber Length | Breaking Load, N | Deflection at Failure, mm |
|---|---|---|---|
| Trial 1 | ½" | 3987 | 3.215 |
| Trial 2 | ½" | 5398 | 5.58 |
| Trial 1 | 1" | 3983 | 4.6 |
| Trial 2 | 1" | 3613 | 3.15 |

TABLE 1.3

Sub frame Right Side Comparison

| Trial | Fiber Length | Breaking Load, N | Deflection at Failure, mm |
|---|---|---|---|
| Trial 1 | ½" | 8205 | 3 |
| Trial 2 | ½" | 6252 | 4.42 |

TABLE 1.3-continued

Sub frame Right Side Comparison

| | Fiber Length | Breaking Load, N | Deflection at Failure, mm |
|---|---|---|---|
| Trial 1 | 1" | 2421 | 0.433 |
| Trial 2 | 1" | 3026 | 1.42 |

The results above show that the structural automotive sub frame component formed from a resin blank having carbon fibers of about one half inch or less had a breaking load of a range greater than 3,900 N to less than or equal to 8,205 N generally, a range of greater than about 6200 N to less than or equal to 8,205 N and preferably greater than about 7,200 N to less than or equal to 8,205 N ideally and greater than about 5,000 N. The values for deflection at the time of failure for the structural automotive sub frame component formed from a resin blank having carbon fibers of about one half inch or less were greater than 3 mm to less than or equal to 15.5 mm generally, greater than 4 mm to less than 15.5 mm preferably or greater than 13.6 mm to less than 15.5 mm ideally. In conclusion the results of the three point bend tests suggest that the structural automotive sub frame components formed from a resin blank having carbon fibers of about one half inch or less offered equivalent or better breaking load and deflection at the time of failure than the structural automotive sub frame components formed from a resin blank having carbon fibers of one inch or more.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structural automotive sub frame component comprising:
   a three-dimensional structure having a plurality of side members each including a plurality of vertical surfaces intersecting with a plurality of horizontal surfaces;
   a plurality cross members of the three dimensional structure extending between the plurality of side members, where each of the plurality of cross members has a plurality vertical surfaces intersecting with a plurality of horizontal surface;
   a plurality of structural ribs formed on and extending away from at least one of the plurality of horizontal surfaces of the plurality of side members and a plurality of structural ribs formed on and extending away from at least one of the plurality of horizontal surfaces of the plurality of cross members; and
   the three-dimensional structure is formed of a resin blank formed from a resin fiber mixture having carbon fibers with a length of about 0.5 inches or less, wherein the plurality of structural ribs are formed of the resin blank having a resin material infused with the carbon fibers, and
   wherein the three dimensional structure is formed entirely from the resin blank that is formed from the resin fiber mixture containing a ratio of resin and carbon fibers one selected from the group consisting of 50:50 and about 30:70 to 70:30.

2. The structural automotive sub frame component of claim 1, wherein the entire structural automotive sub frame component is one piece without any connections of multiple components.

3. The structural automotive sub frame component of claim 1, wherein the length of the carbon fibers are about 0.4 inches.

4. The structural automotive sub frame component of claim 1, wherein the resin fiber mixture contains resin that is one selected from the group comprising vinyl ester resin, polyurethane, epoxy, unsaturated polyester, phenolic polymers and combinations thereof.

5. The structural automotive sub frame component of claim 1, wherein the carbon fibers of the resin blank are uniformly dispersed throughout the resin blank.

6. The structural automotive sub frame component of claim 1, wherein the structural automotive sub frame component has a breaking load greater than about 5000 N when tested for three point bend test.

7. The structural automotive sub frame component of claim 6, wherein the deflection of the structural automotive sub frame component at the breaking load is greater than about 3 mm.

8. A structural automotive sub frame component comprising:
   a three-dimensional structure having a plurality of side members each including a plurality of vertical surfaces intersecting with a plurality of horizontal surfaces;
   a plurality cross members of the three dimensional structure extending between the plurality of side members, where each of the plurality of cross members has a plurality vertical surfaces intersecting with a plurality of horizontal surface; and
   the three-dimensional structure is formed of a resin blank formed from a resin fiber mixture having carbon fibers with a length of about 0.5 inches or less, wherein the entire structural automotive sub frame component is one piece without any connections of multiple components, wherein the plurality of structural ribs are formed of the resin blank having a resin material infused with the carbon fibers, and
   wherein the three dimensional structure is formed entirely from the resin blank that is formed from the resin fiber mixture containing a ratio of resin and carbon fibers one selected from the group consisting of 50:50 and about 30:70 to 70:30.

9. The structural automotive sub frame component of claim 8, wherein the length of the carbon fibers about 0.4 inches.

10. The structural automotive sub frame component of claim 8, wherein the resin fiber mixture contains resin that is one selected from the group comprising vinyl ester resin, polyurethane, epoxy, unsaturated polyester, phenolic polymers and combinations thereof.

11. The structural automotive sub frame component of claim 8, wherein the carbon fibers of the resin blank are uniformly dispersed throughout the resin blank.

12. The structural automotive sub frame component of claim 8, wherein the structural automotive sub frame component has a breaking load greater than about 5000 N when tested for three point bend test.

13. The structural automotive sub frame component of claim 12, wherein the deflection of the structural automotive sub frame component at the breaking load is greater than about 3 mm.

* * * * *